(12) United States Patent
Grahek et al.

(10) Patent No.: US 11,662,042 B2
(45) Date of Patent: May 30, 2023

(54) CLAMP ASSEMBLY AND METHOD FOR SECURING A CLAMP ASSEMBLY TO A STRUT

(71) Applicant: Eaton Intelligent Power Limited, Dublin (IE)

(72) Inventors: Nicholas Robert Grahek, Glen Carbon, IL (US); Amol Anil Khalkar, Nashik (IN)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/816,451

(22) Filed: Aug. 1, 2022

(65) Prior Publication Data
US 2023/0037697 A1    Feb. 9, 2023

Related U.S. Application Data

(60) Provisional application No. 63/229,341, filed on Aug. 4, 2021.

(51) Int. Cl.
*F16L 3/00* (2006.01)
*F16L 3/24* (2006.01)

(52) U.S. Cl.
CPC .................................... *F16L 3/243* (2019.08)

(58) Field of Classification Search
CPC ........................................................ F16L 3/243
See application file for complete search history.

(56) References Cited

U.S. PATENT DOCUMENTS

| | | | |
|---|---|---|---|
| 3,650,499 A | 3/1972 | Biggane | |
| 4,044,428 A | 8/1977 | Kowalski | |
| 5,141,186 A * | 8/1992 | Cusic | F16L 3/2431 248/68.1 |
| 5,163,644 A * | 11/1992 | Kowalski | F16L 3/221 248/68.1 |
| 5,855,342 A * | 1/1999 | Hawkins | F16L 3/243 248/68.1 |
| 6,494,415 B1 * | 12/2002 | Roth | F16L 3/243 248/62 |

(Continued)

FOREIGN PATENT DOCUMENTS

JP    S55157183    11/1980

OTHER PUBLICATIONS

International Search Report issued in corresponding application No. PCT/EP2022/025363 dated Nov. 10, 2022, 5 pages.

(Continued)

*Primary Examiner* — Amy J. Sterling
(74) *Attorney, Agent, or Firm* — Pearne & Gordon LLP

(57) ABSTRACT

A clamp assembly for securing a conduit to a strut, the clamp assembly includes a pair of brackets, each bracket having a head section and a tail section. The respective tail sections of the pair of brackets being configured to be received within the strut and the pair of brackets having respective apertures formed in the respective head sections thereof. A bolt has a shank that is configured to be received within the respective apertures of the pair of brackets. A nut has a bore therein, the bore is configured to receive the shank of the bolt. Each of the respective apertures includes a pair of opposite, rounded surfaces spaced from each other and connected by a pair of opposite, elongated surfaces.

16 Claims, 6 Drawing Sheets

(56) References Cited

U.S. PATENT DOCUMENTS

| | | | | |
|---|---|---|---|---|
| 7,591,442 | B2* | 9/2009 | Dinh | F16L 3/1033 |
| | | | | 248/62 |
| 7,992,829 | B1* | 8/2011 | Baker | F16L 3/243 |
| | | | | 248/62 |
| 9,546,744 | B2* | 1/2017 | Patil | F16L 3/1083 |
| 11,009,153 | B1* | 5/2021 | Hikoyama | F16L 3/1008 |
| 11,466,796 | B2* | 10/2022 | Fisher | F16L 3/222 |
| 2012/0025034 | A1* | 2/2012 | Turner | F16L 3/04 |
| | | | | 248/65 |
| 2014/0097304 | A1* | 4/2014 | Mastro | F16L 3/243 |
| | | | | 29/428 |
| 2015/0276092 | A1* | 10/2015 | Oliver | C23C 28/025 |
| | | | | 248/65 |

OTHER PUBLICATIONS

Written Opinion issued in corresponding application No. PCT/EP2022/025363 dated Nov. 10, 2022, 8 pages.

* cited by examiner

CLAMP ASSEMBLY AND METHOD FOR SECURING A CLAMP ASSEMBLY TO A STRUT

FIELD OF THE INVENTION

This application relates generally to a clamp assembly, and more particularly, a clamp assembly configured to secure a conduit to a strut.

BACKGROUND OF THE INVENTION

Conventional means for securing a conduit to a strut are depicted in FIG. 9, and include a pair of brackets 402, 404, a bolt 406, and a nut 408. Each of the brackets 402, 404 includes a contact face 403, 405 configured to face and engage (i.e., contact) an external, circumferential surface of the conduit (e.g., a conduit 200 depicted in FIG. 1). As further shown, each of the brackets 402, 404 includes circular-shaped apertures 410 configured to receive a shank of the bolt 406 therein. As shown in FIG. 9, the brackets are shown in an assembled state, wherein the respective contact faces 403, 405 of the brackets 402, 404 face the same direction. This permits the assembly to have a relatively low profile such that an end user (e.g., a field operator) can easily store the assembly in their pocket prior to installation.

During installation, the nut 408 must first be removed (completely) from the bolt 406 in order to remove one of the brackets 404 from the bolt 406. After the bracket 404 has been removed, the other bracket 402 is inserted into a strut (e.g., a strut 300 depicted in FIG. 1) such that its contact face 403 faces (e.g., contacts) the external, circumferential surface of the conduit 200. Thereafter, the removed bracket 404 is inserted into the strut 300 and is translated such that the bolt 406 once again is received within its corresponding aperture 410. Thereafter, the nut 408 is reattached to the bolt 406 and fastened thereto such that the brackets 402, 404 provide a clamping force on the conduit 200 and secure it to the strut 300.

While the conventional assembly provides a relatively low profile such that an end user can store the assembly in their pocket, the method of securing the assembly to a strut requires removing both the nut 408 and one of the brackets 404 from the bolt 406. The removal of these components increases overall installation time as well as the chances for components of the assembly to be dropped/lost during installation.

BRIEF SUMMARY OF THE INVENTION

In accordance with one aspect, there is provided a clamp assembly configured to secure a conduit to a strut. The clamp assembly includes a pair of brackets, each bracket having a head section and a tail section. The respective tail sections of the pair of brackets are configured to be received within the strut, and the pair of brackets have respective apertures formed in the respective head sections thereof. A bolt has a shank being configured to be received within the respective apertures of the pair of brackets. A nut has a bore therein, the bore is configured to receive the shank of the bolt. Each of the respective apertures includes a pair of opposite, rounded surfaces spaced from each other and connected by a pair of opposite, elongated surfaces.

In accordance with another aspect, there is provided a clamp assembly configured to secure a conduit to a strut. The clamp assembly includes a pair of brackets, each bracket having a head section, a tail section, and an intermediate section disposed therebetween. The intermediate section has a radius of curvature such that the head section is laterally offset from the tail section. The tail section is configured to be received within the strut and includes a pair of notches formed in opposite side-edges, respectively, thereof. The pair of brackets have respective apertures formed in the respective head sections thereof. Each of the respective apertures has an elongated profile, extending longitudinally between opposite side-edges of the respective head section.

The clamp assembly further includes a bolt having a shank, the shank being configured to be received within the respective apertures of the pair of brackets. A nut has a bore therein that is configured to receive the shank of the bolt. Each of the respective apertures includes a pair of opposite, rounded surfaces spaced from each other and connected by a pair of opposite, elongated surfaces. The pair of opposite, elongated surfaces includes a top elongated surface and a bottom elongated surface. The top elongated surface extends between and connects respective top distal sections of the pair of opposite, rounded surfaces. The bottom elongated surface extends between and connects respective bottom distal sections of the pair of opposite, rounded surfaces.

In accordance with a further aspect, there is provided a method of securing a conduit to a strut by way of a clamp assembly. The clamp assembly includes first and second brackets, each of the first and second brackets having a head section, a tail section, and a contact face configured to contact the conduit. The head section has an aperture formed therein. A bolt has a head and a shank, the shank being configured to be received within the respective apertures of the first and second brackets. A nut has a bore therein, the bore being configured to receive the shank of the bolt.

The method includes the steps of providing an assembled clamp assembly wherein the bore of the nut receives the shank therein. Further, the shank is received within the respective apertures of the first and second brackets such that the respective head sections of the first and second brackets are disposed between the head of the bolt and the nut. Further still, the respective contact faces of the first and second brackets face one another. The method further includes the steps of inserting the tail section of the first bracket into a channel of the strut such that the contact face of the first bracket contacts the conduit, and inserting the tail section of the second bracket into the channel of the strut. The respective tail sections of the first and second brackets are inserted into the channel without removing the shank from either of the respective apertures of the first and second brackets.

DESCRIPTION OF EXAMPLE EMBODIMENTS

Figure 1:
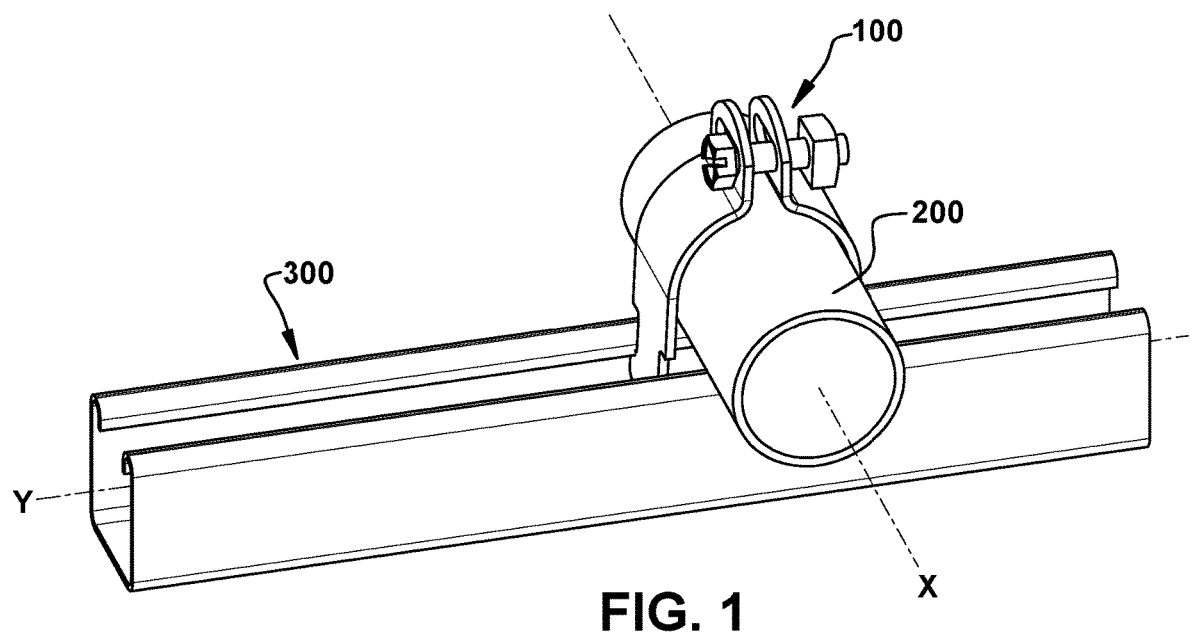
FIG. 1 is a perspective view of a clamp assembly securing a conduit to a strut.

Referring now to the drawings, FIG. 1 depicts a perspective view of a clamp assembly 100. Specifically, the clamp assembly is shown in an installed position, wherein the clamp assembly secures (i.e., affixes) a conduit 200 to a strut 300. Notably, the conduit 200 can be an electrical conduit, housing and guiding electrical wires/components along its length, a fluid conduit, guiding a flow of liquid or air along its length, or any other type of medium guide. Further, while the conduit 200 is shown as being a hollow cylinder, having a circular shape in cross-section, it is to be understood that the conduit 200 can have an alternative shape in cross-section (e.g., square, rectangle, triangle, etc.), or even multiple shapes in cross-section.

The clamp assembly 100 is configured to secure the conduit 200 to the strut 300 in a perpendicular orientation with respect thereto. That is, the conduit 200 extends along a central axis 'X' and the strut 300 extends along a longitudinal axis 'Y.' As will be discussed further below, when the clamp assembly 100 is secured to the strut 300 to affix the conduit 200 thereto, the central axis 'X' (along which the conduit 200 extends) and the longitudinal axis 'Y' (along which the strut 300 extends) are perpendicular with respect to one another. It is to be understood that the clamp assembly 100 need not secure the conduit 200 to the strut 300 in a perpendicular manner. For example, it is contemplated that the clamp assembly 100 can be configured to affix the conduit 200 to the strut 300 such that the central axis 'X' and the longitudinal axis 'Y' are oriented parallel with respect to one another, or even such that said axes are oriented in neither a parallel, nor perpendicular orientation with respect to one another.

Figure 2:
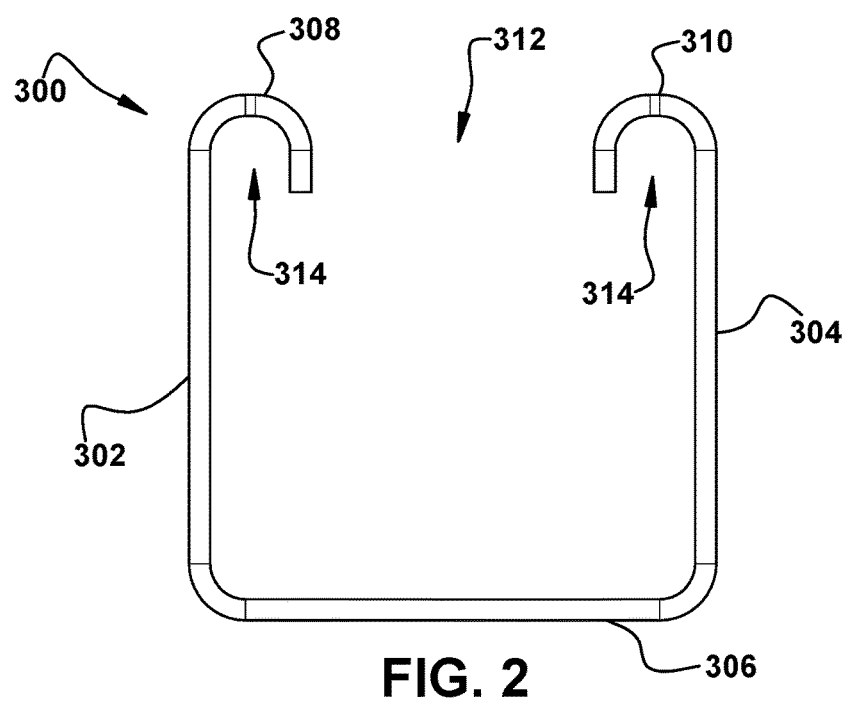
FIG. 2 is an end view of the strut shown in FIG. 1.

Moving now to FIG. 2, an end view of the strut 300 is shown. In particular, the strut 300 includes a pair of side walls 302, 304 spaced from and connected to one another via a base wall 306. Notably, in the depicted embodiment, base wall 306 and the side walls 302, 304 are shown as being linear/planar in nature. It is contemplated that the base wall 306 and/or the side walls 302, 304 need not have a planar configuration, for example, at least one of the base wall 306 and the side walls 302, 304 can have a radius of curvature such that said wall has a convex or concave shape (in cross-section).

In the depicted embodiment, the side walls 302, 304 each extend away from the base wall 306 and are oriented parallel with respect to one another. Moreover, each of the side walls 302, 304 is oriented perpendicular with respect to the base wall 306. It is to be understood that the side walls 302, 304 need not be oriented parallel with respect to one another, and/or the side walls 302, 304 need not be oriented perpendicular with respect to the base wall 306. For example, one of the side walls 302 can be arranged such that an angle (in cross-section) between said side wall 302 and the base wall 306 is acute or obtuse, and the other one of the side walls 304 can be arranged perpendicular to the base wall 306.

As further shown in FIG. 2, the side walls 302, 304 have respective flanges 308, 310 formed at corresponding distal ends thereof. In particular, each flange 308, 310 extends from its respective side wall 302, 304 and includes a U-shaped bend, such that a distal end thereof faces and extends towards the base wall 306. In this manner, both flanges 308, 310 extend over the base wall 306 (in a direction towards one another) to collectively define a channel 312 within the strut 300. Moreover, each U-shaped bend defines a pocket 314 therein, as will be further discussed below.

Of note, while the depicted embodiment shows the flanges 308, 310 having a U-shaped bend, it is contemplated that the bend in each flange 308, 310 can have a sharp bend (i.e., a V-shaped bend, forming an acute angle) or any other shaped bend. Moreover, it is to be understood that the aforementioned components of the strut 300 (i.e., the base wall 306, the pair of side walls 302, 304, and their respective flanges 308, 310) are formed integral as a single piece part during a simultaneous manufacturing process (e.g., an extrusion process). However, it is contemplated that said components of the strut 300 need not be formed integral with respect to one another. For example, in one embodiment, the base wall 306 and the pair of side walls 302, 304 can be formed integral as a single piece part, and the flanges 308, 310 can be formed as separate elements that are subsequently affixed to the respective ends of the side walls 302, 304.

Figure 3:
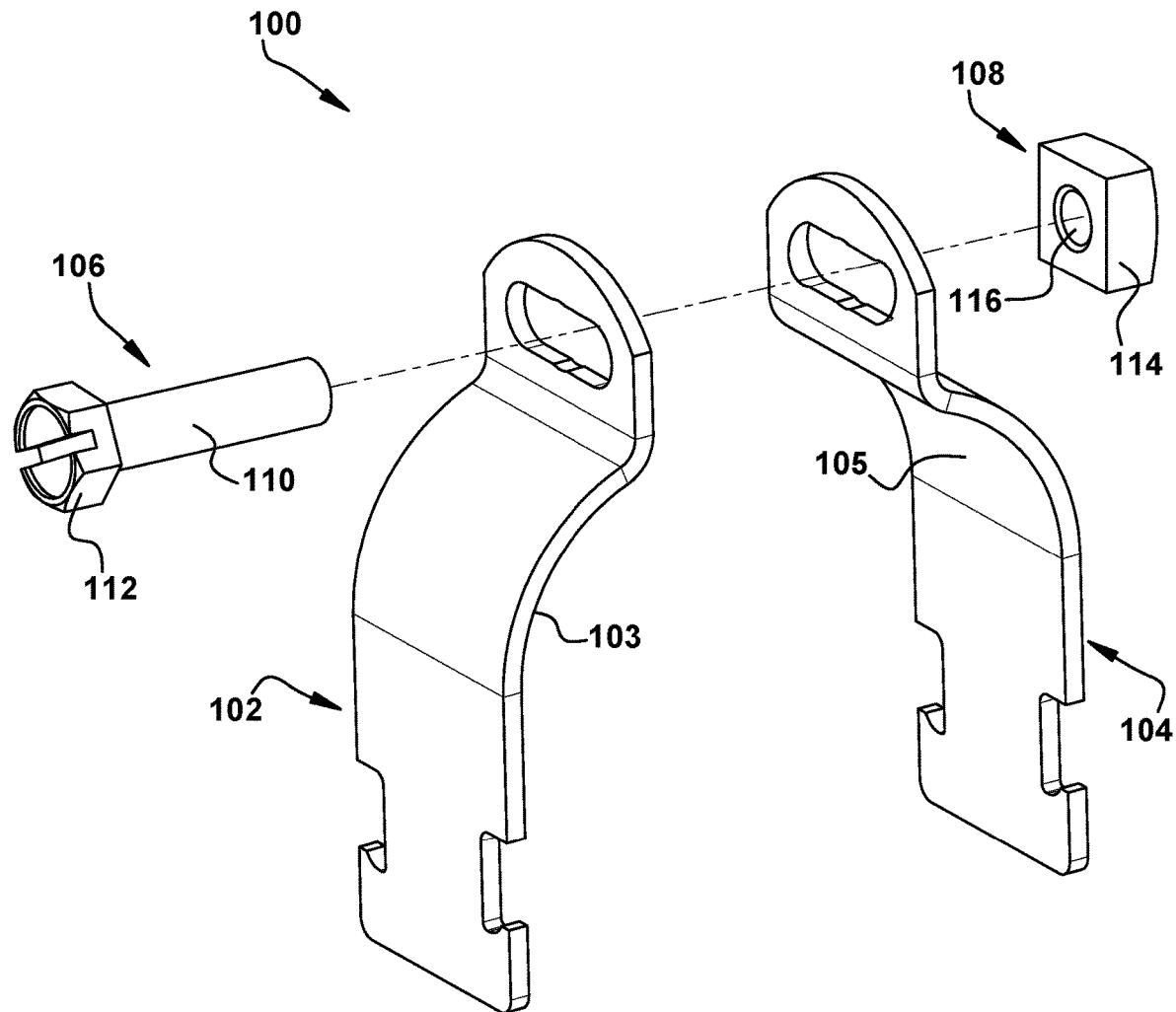
FIG. 3 is an exploded view of the clamp assembly shown in FIG. 1, including a pair of brackets, a screw, and a nut.

Moving now to FIG. 3, the clamp assembly 100 is shown in an exploded view and includes a pair of brackets 102, 104, a bolt 106 and a nut 108. Notably, in the depicted embodiment the brackets 102, 104 are identical to one another in both shape and dimension. However, in other embodiments, the brackets 102, 104 may be different from one another in shape and/or dimension. Each bracket 102, 104 has a corresponding contact face 103, 105, configured to face and/or contact the conduit 200 when the clamp assembly 100 is in an installed position, as will be further discussed below. The bolt 106 includes a shank 110 with a head 112 formed at an end thereof. The nut 108 has a body 114 with a central bore 116 formed therein. Notably, the bore 116 may be a through-hole that extends completely through the body 114 of the nut 108 (i.e., from one external surface to an opposite external surface). Alternatively, the bore 116 can extend only partially through the body 114. Further still, the nut 108 can be a lock nut or any other type of fastener. The shank 110 of the bolt 106 can have a male thread (not shown) formed on a circumferential surface thereof that corresponds to a female thread (not show) formed on an inner peripheral surface of the bore 116. Notably, the male thread can be formed along an entire axial length of the shank 110, or only along a portion of its axial length. The shank 110 is configured to be received within the bore 116 as will be further discussed below.

Figure 4:
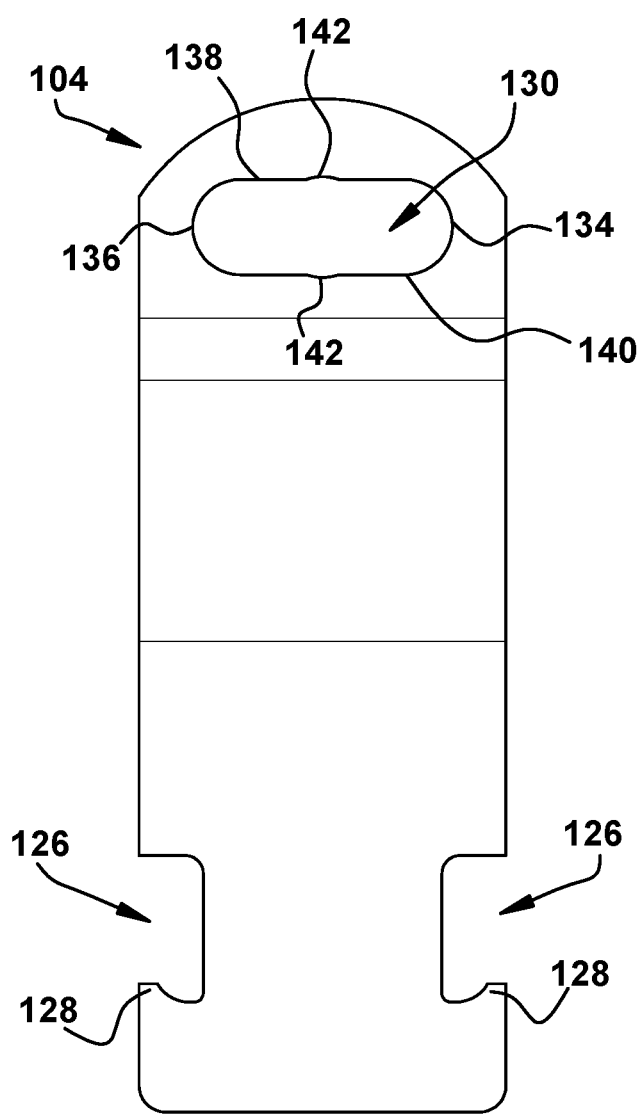
FIG. 4 is a front view of one of the brackets shown in FIG. 3.
Figure 5:
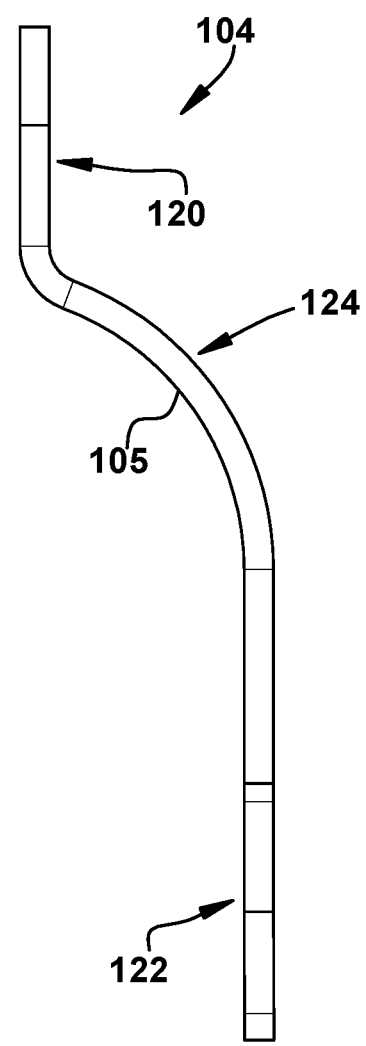
FIG. 5 is a side view of the bracket shown in FIG. 4.

Moving now to FIGS. 4-5, one of the brackets 104 of the pair of brackets 102, 104 is shown. While the following description relates to the configuration of only a single bracket (i.e., the bracket 104) of the pair of brackets 102, 104, it is to be understood that the below disclosure likewise applies to the other bracket 102 of the pair of brackets 102, 104, as said brackets 102, 104 are identical.

As shown, the bracket 104 includes a body having a head section 120, a tail section 122, and an intermediate section 124 disposed therebetween. Notably, the head section 120, the tail section 122, and the intermediate section 124 are all formed integral with one another as a single piece part. Alternatively, the head section 120, the tail section 122, and the intermediate section 124, can be formed separate and distinct from one another and subsequently secured to one another. As depicted, the head section 120 and the tail section 122 are both plate-like (i.e., planar in shape) and are arranged parallel with respect to one another. However, in other embodiments, the head section 120 and the tail section 122 can have an arrangement other than parallel. The intermediate section 124 has a radius of curvature formed therein such that the head section 120 is laterally offset from the tail section 122 (via the intermediate section 124). Of note, the radius of curvature formed in the intermediate section 124 can substantially correspond to a radius of curvature of the conduit 200. Alternatively, the radius of curvature formed in the intermediate section 124 can be greater than or less than that of the conduit 200. Moreover, at least the intermediate section 124 defines the contact face 105 of the bracket 104. That is, the contact face 105 may be defined by the intermediate section 124 and also at least one additional section (e.g., the head section 120 and/or the tail section 122).

As best shown in FIG. 4, a pair of dovetail shaped notches 126 are formed in opposite side-edges, respectively, of the tail section 122. In particular, each notch 126 is recessed from its respective side edge towards a center of the bracket 104 and has a protruding hook member 128 defined therein. As will be discussed further below, the notches 126 are sized and shaped to receive a respective one of the flanges 308, 310 of the strut 300, and the hook members 128 are configured to be received within the pockets 314.

Figure 9:
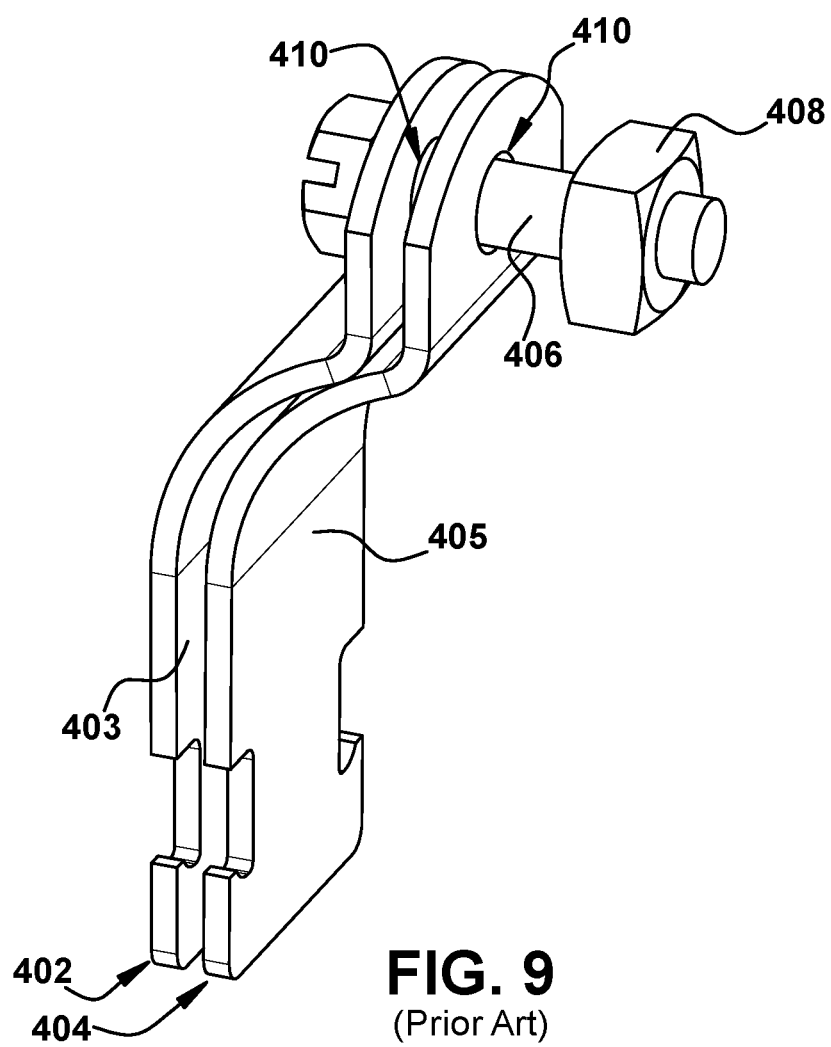
FIG. 9 is a perspective view of a prior art clamp assembly.

As further shown in FIG. 4, an aperture 130 is formed in the head section 120 of the bracket 104. Notably, the aperture 130 is a through-hole formed completely through the bracket 104 (i.e., extending from one external surface to an opposite external surface). Unlike the conventionally-shaped aperture 410 (i.e., a circular-shaped through-hole) as shown in FIG. 9, the aperture 130 has an elongated profile, extending (longitudinally) between the opposite side-edges of the head section 120. More specifically, the aperture 130 is defined by a pair of opposite, rounded (i.e., crescent-shaped) surfaces 134, 136 connected by a pair of opposite, elongated surfaces 138, 140. The rounded surfaces 134, 136 face one another and are disposed closer to their respective side-edges of the head section 120 than the elongated surfaces 138, 140. Each elongated surface connects a distal section of one of the rounded surfaces 134 to a corresponding distal section of the other rounded surface 136. For example, a top elongated surface 138 extends between and connects top distal sections of the pair of rounded surfaces 134, 136, and a bottom elongated surface 140 extends between and connects bottom distal sections of the pair of rounded surfaces 134, 136. Further, each of the top and bottom elongated surfaces 138, 140 are shown as extending linearly (i.e., along a straight line) between the corresponding distal sections of the rounded surfaces 134, 136. Accordingly, the aperture 130 has a generally oblong-shape, extending longitudinally in a direction between the opposite side-edges of the bracket 104.

Furthermore, the top and bottom elongated surfaces 138, 140 have respective recesses 142 formed therein. Notably, each recess 142 is formed at a center point of its corresponding elongated surface 138, 140 (i.e., a center point between the corresponding distal sections of the rounded surfaces 134, 136). The recesses 142 are configured to help locate the shank 110 of the bolt 106 within the aperture 130.

As mentioned above, the brackets 102, 104 are identical to one another. However, it is contemplated that the brackets 102, 104 need not be identical. For example, each of the brackets 102, 104 can have respective apertures 130 with the same dimensions, however the aperture 130 of one bracket 102 can be offset from the aperture 130 of the other bracket 104. In another example, the respective apertures 130 of the brackets 102, 104 can have different dimensions with respect to one another.

Figure 6:
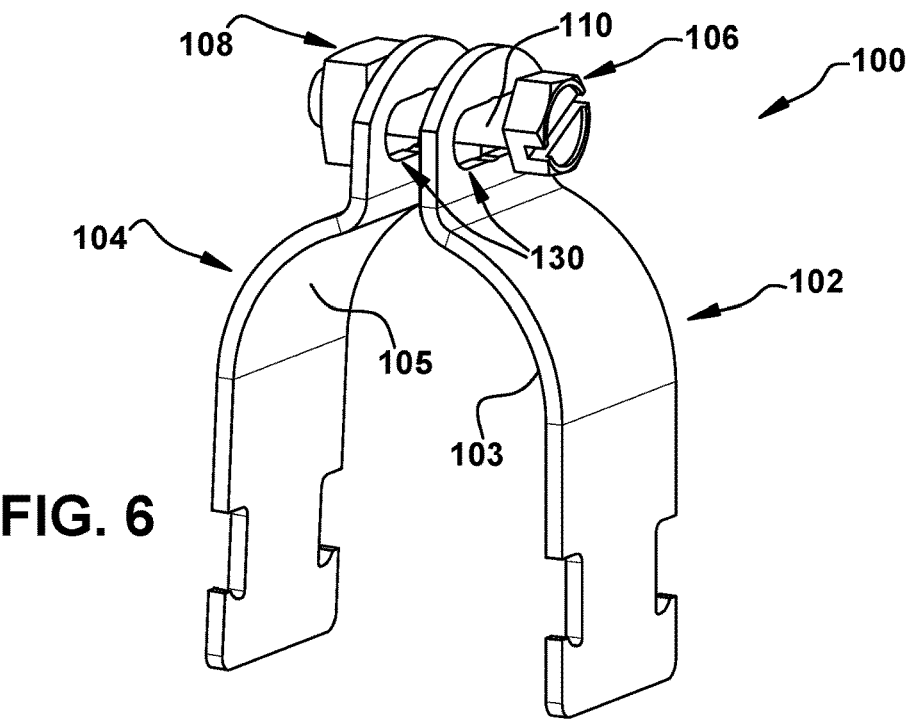
FIG. 6 is perspective view of the clamp assembly shown in FIG. 3, in an assembled, but pre-installed state.

Moving now to FIG. 6, the clamp assembly 100 is shown in an assembled, but pre-installed state. That is, FIG. 6 depicts the components of the clamp assembly 100 being in a completely assembled state with respect to one another such that the clamp assembly 100 can be installed (i.e., secured) to the strut 300 to fasten the conduit 200 thereto, as will be further explained below. As shown, when the clamp assembly 100 is in the assembled state, the shank 110 of the bolt 106 passes through the respective apertures 130 formed in the pair of brackets 102, 104 and is received within the bore 116 of the nut 108 such that the bolt 106 is fastened thereto (e.g., via threaded-mating engagement). Accordingly, in the assembled state, the pair of brackets 102, 104 are movable/shiftable with respect to one another about the longitudinal axis of the shank 110 (i.e., capable of both translating and rotating about the longitudinal axis), but are constrained from complete separation from one another via the head 112 of the bolt 106 and the nut 108. In other words, the pair of brackets 102, 104 are constrained from being removed from the bolt 106 (i.e., the shank 110). Moreover, as shown, the pair of brackets 102, 104 are arranged in the assembled state such that the respective contact faces 103, 105 thereof face one another.

Figure 7:
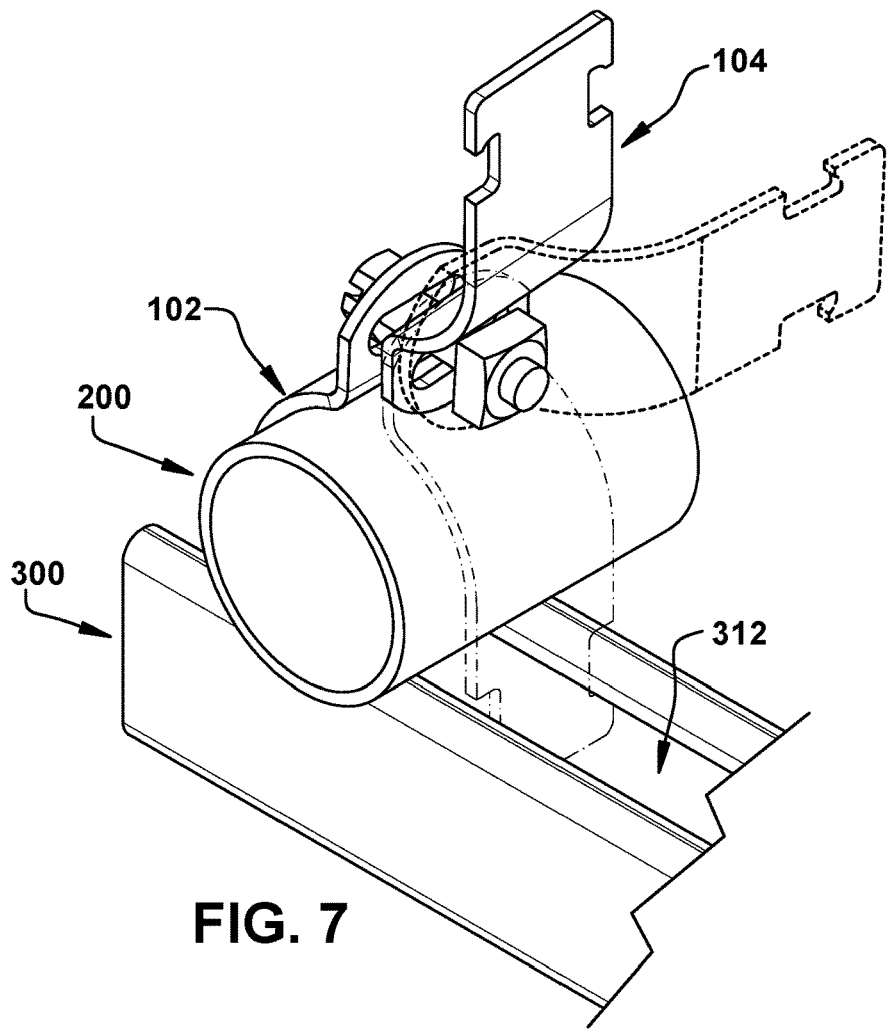
FIG. 7 is a perspective view of the clamp assembly shown in a first partially installed position with respect to the strut.

Now moving to FIG. 7, installation of the assembled clamp assembly 100 with respect to the conduit 200 and the strut 300 will now be described. Initially, one of the brackets 104 is rotated 180° about the longitudinal axis of the bolt 106 with respect to the other bracket 102. While the bracket 104 is shown as being rotated 180° degrees from its original position (e.g., as shown in FIG. 6) it is to be understood, that the bracket 104 need not be rotated a full 180° degrees, rather the bracket 104 may be rotated 90° degrees from its original position, or even less.

Thereafter, the other bracket 102 is secured to the strut 300 by inserting its tail section 122 into the channel 312 of the strut 300 such that the flanges 308, 310 are respectively received within the notches 126 of the bracket 102 and such that the hook members 128 are respectively received within the pockets 314 (depicted in FIG. 2) of the flanges 308, 310. As further shown, the contact face 103 of the bracket 102 is disposed adjacent (e.g., contacting) the external, circumferential surface of the conduit 200.

Figure 8:
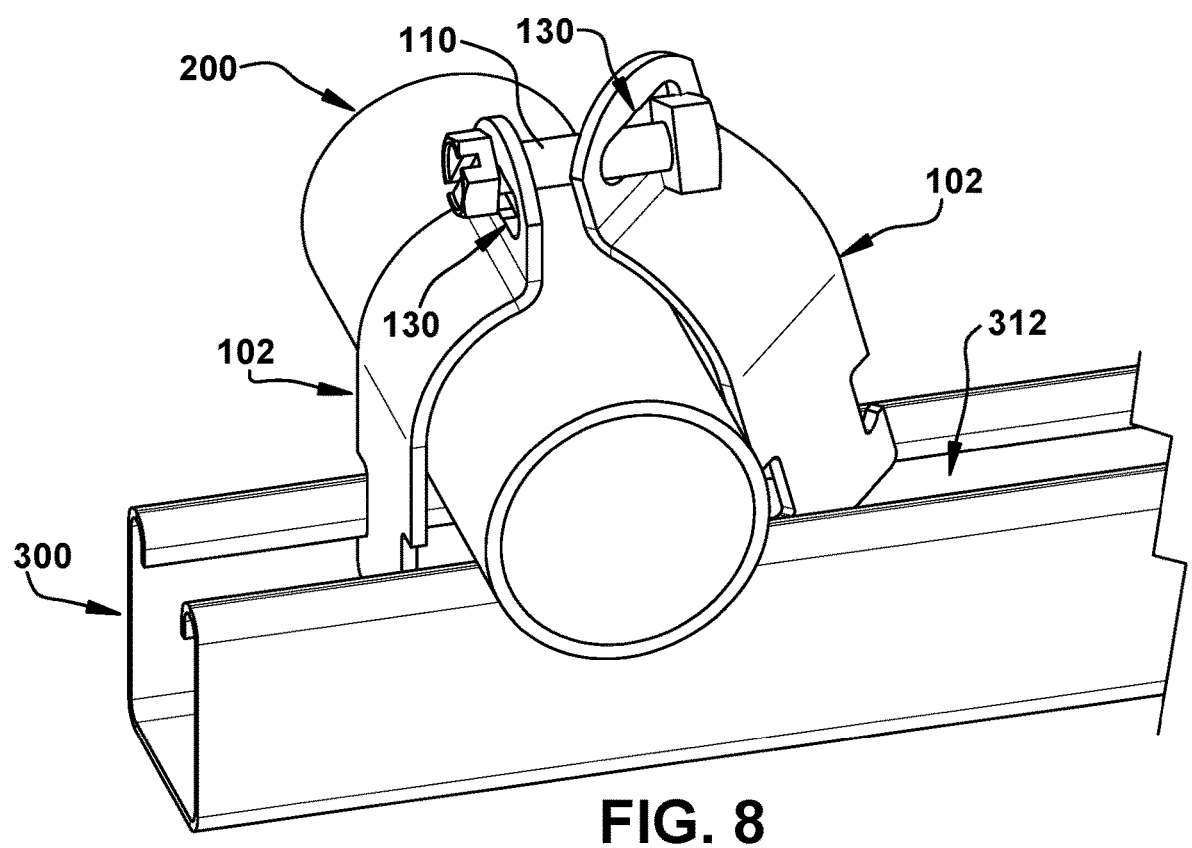
FIG. 8 is a perspective view of the clamp assembly shown in a second partially installed position with respect to the strut.

Next, the initially rotated bracket 104 is once again rotated back towards its original position (as shown in FIG. 6). That is, the bracket 104 is rotated such that its tail section 122 is guided towards the strut 300. With respect to FIG. 8, as the bracket 104 (i.e., its tail section 122) approaches the strut 300, the bracket 104 is skewed to permit the necessary clearance for the tail section 122 to enter the channel 312 of the strut 300. Notably, the ability to skew the bracket 104 is directly related to the configuration of the aperture 130 formed in the head section 120 of the bracket 104. Specifically, the oblong-shaped aperture 130 permits the bracket 104 to slide laterally in an imaginary plane to which the longitudinal axis of the bolt 106 is normal to. Accordingly, the bracket 104 can slide until the shank 110 of the bolt 106 engages with one of the rounded surfaces 136 of the aperture 130; further, even at this point, the bracket 104 can be rotated and shifted such that the tail section 122 of the bracket 104 can be inserted into the channel 312 of the strut 300.

After the tail section 122 of the bracket 104 is received within the channel 312 of the strut 300, the bracket 104 is then skewed back to its original position (i.e., such that the contact face 105 of the bracket 104 is perpendicular to the longitudinal axis 'Y,' shown in FIG. 1). In such a position, the flanges 308, 310 of the strut 300 are respectively received within the notches 126 of the bracket 104, and the hook members 128 are respectively received within the pockets 314 (depicted in FIG. 2). Moreover, as depicted in FIG. 7, after the bracket 104 is adjusted (i.e., to its original orientation, shown in FIG. 6) the contact face 105 of the bracket 104 is disposed adjacent (e.g., contacts) the external, circumferential surface of the conduit 200. Finally, the bolt 106 and nut 108 can be fastened with respect to one another such that the nut 108 moves (along the shank 110) closer towards the head 112 of the bolt 106. Doing so provides a clamping force on the conduit 200 (i.e., via the pair of brackets 102, 104) such that the respective contact faces 103, 105 of the pair of brackets 102, 104 contact and engage the conduit 200. In this manner, the conduit 200 is secured (i.e., fastened) to the strut 300.

Accordingly, during installation, the above-described clamp assembly 100 permits the brackets 102, 104 to be received within the strut 300 and disposed about the conduit 200 (to fasten the conduit 200 to the strut 300) without the need to completely separate one of the brackets from the other (i.e., by removing the shank 110 of the bolt 106 from the aperture 130 of the bracket). In other words, the bolt 106 is continuously received within the respective apertures 130 of the brackets 102, 104 during the entire installation process. As such, the above-described clamp assembly 100 not only cuts down on installation time with respect to conventional assemblies (e.g., as shown in FIG. 9 and described above), but it also prevents loss of the components of the clamp assembly 100 as neither the nut 108 nor any of the brackets 102, 104 need to be removed from the bolt 106 prior to or during installation.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A clamp assembly configured to secure a conduit to a strut, the clamp assembly comprising:
    a pair of brackets, each bracket having a head section and a tail section, wherein the respective tail sections of the pair of brackets are configured to be received within the strut, and wherein the pair of brackets have respective apertures formed in the respective head sections thereof;
    a bolt having a shank, the shank being configured to be received within the respective apertures of the pair of brackets; and
    a nut having a bore therein, the bore being configured to receive the shank of the bolt,
    wherein each of the respective apertures includes a pair of opposite, rounded surfaces spaced from each other and connected by a pair of opposite, elongated surfaces.

2. The clamp assembly of claim 1, wherein each rounded surface of the pair of opposite, rounded surfaces is crescent shaped.

3. The clamp assembly of claim 1, wherein each of the respective apertures has an elongated profile, extending longitudinally between opposite side-edges of the head section of the corresponding bracket.

4. The clamp assembly of claim 1, wherein the pair of opposite, rounded surfaces face one another and are disposed closer to respective side-edges of the head section than the pair of opposite, elongated surfaces.

5. The clamp assembly of claim 1, wherein the pair of opposite, elongated surfaces includes a top elongated surface and a bottom elongated surface, wherein the top elongated surface extends between and connects respective top distal sections of the pair of opposite, rounded surfaces, and wherein the bottom elongated surface extends between and connects respective bottom distal sections of the pair of opposite, rounded surfaces.

6. The clamp assembly of claim 5, wherein the top elongated surface extends linearly between the respective top distal sections of the pair of opposite, rounded surfaces, and wherein the bottom elongated surface extends linearly between the respective bottom distal sections of the pair of opposite, rounded surfaces.

7. The clamp assembly of claim 5, wherein respective recesses are formed in the top elongated surface and the bottom elongated surface.

8. The clamp assembly of claim 7, wherein the respective recesses are formed at corresponding center points of the top elongated surface and the bottom elongated surface.

9. The clamp assembly of claim 7, wherein the respective recesses are configured to locate the shank of the bolt within the apertures.

10. The clamp assembly of claim 1, wherein the head section and the tail section are arranged parallel with respect to one another.

11. The clamp assembly of claim 10, wherein the head section is laterally offset from the tail section.

12. The clamp assembly of claim 1, each bracket further including an intermediate section disposed between the head section and the tail section, wherein the intermediate section has a radius of curvature such that the head section is laterally offset from the tail section.

13. The clamp assembly of claim 1, each bracket further including a pair of notches formed in opposite side-edges, respectively, of the tail section.

14. The clamp assembly of claim 13, wherein the pair of notches are dovetail shaped.

15. A clamp assembly configured to secure a conduit to a strut, the clamp assembly comprising:
    a pair of brackets, each bracket having a head section, a tail section, and an intermediate section disposed therebetween, wherein the intermediate section has a radius of curvature such that the head section is laterally offset from the tail section, wherein the tail section is configured to be received within the strut and includes a pair of notches formed in opposite side-edges, respectively, thereof, and wherein the pair of brackets have respective apertures formed in the respective head sections thereof, wherein each of the respective apertures has an elongated profile, extending longitudinally between opposite side-edges of the respective head section;
    a bolt having a shank, the shank being configured to be received within the respective apertures of the pair of brackets; and
    a nut having a bore therein, the bore being configured to receive the shank of the bolt,
    wherein each of the respective apertures includes a pair of opposite, rounded surfaces spaced from each other and connected by a pair of opposite, elongated surfaces, and
    wherein the pair of opposite, elongated surfaces includes a top elongated surface and a bottom elongated surface, wherein the top elongated surface extends between and connects respective top distal sections of the pair of opposite, rounded surfaces, and wherein the bottom elongated surface extends between and connects respective bottom distal sections of the pair of opposite, rounded surfaces.

16. A method of securing a conduit to a strut by way of a clamp assembly, the clamp assembly comprising:
- first and second brackets, each of the first and second brackets having a head section, a tail section, and a contact face configured to contact the conduit, wherein the head section has an aperture formed therein;
- a bolt having a head and a shank, the shank being configured to be received within the respective apertures of the first and second brackets; and
- a nut having a bore therein, the bore being configured to receive the shank of the bolt, the method comprising the steps of:
- providing an assembled clamp assembly wherein the bore of the nut receives the shank therein, wherein the shank is received within the respective apertures of the first and second brackets such that the respective head sections of the first and second brackets are disposed between the head of the bolt and the nut, and wherein the respective contact faces of the first and second brackets face one another;
- inserting the tail section of the first bracket into a channel of the strut such that the contact face of the first bracket contacts the conduit; and
- inserting the tail section of the second bracket into the channel of the strut,
- wherein the respective tail sections of the first and second brackets are inserted into the channel without removing the shank from either of the respective apertures of the first and second brackets.

* * * * *